United States Patent
Sung (10) Patent No.: US 7,035,315 B2
(45) Date of Patent: Apr. 25, 2006

(54) DOPPLER CORRECTED COMMUNICATIONS RECEIVER AND METHOD OF REMOVING DOPPLER FREQUENCY SHIFT

(75) Inventor: Po-An Sung, Budd Lake, CA (US)

(73) Assignee: Lucent Technologies Inc., Murray Hill, NJ (US)

( * ) Notice: Subject to any disclaimer, the term of this patent is extended or adjusted under 35 U.S.C. 154(b) by 804 days.

(21) Appl. No.: 09/841,487

(22) Filed: Apr. 24, 2001

(65) Prior Publication Data

US 2002/0181626 A1    Dec. 5, 2002

(51) Int. Cl.
    *H04B 1/69*    (2006.01)
(52) U.S. Cl. .................. 375/147; 375/136; 375/141; 375/142; 375/316; 375/325; 342/171; 342/357.05
(58) Field of Classification Search ............... 375/342, 375/347, 148, 224, 346, 147, 130, 280, 146, 375/316, 136, 141, 142, 325; 370/342, 229; 342/367, 357.12, 171, 375.05
See application file for complete search history.

(56) References Cited

U.S. PATENT DOCUMENTS

| | | | |
|---|---|---|---|
| 5,007,068 A * | 4/1991 | Simon et al. ............... | 375/280 |
| 5,640,431 A | 6/1997 | Bruckert et al. ............ | 375/344 |
| 5,659,573 A | 8/1997 | Bruckert et al. ............ | 375/200 |
| 5,691,974 A | 11/1997 | Zehavi et al. ............... | 370/203 |
| 5,894,473 A | 4/1999 | Dent .......................... | 370/342 |
| 5,910,950 A | 6/1999 | ten Brink .................... | 370/342 |
| 6,085,104 A | 7/2000 | Kowalski et al. ........... | 455/506 |
| 6,141,374 A | 10/2000 | Burns ......................... | 375/152 |
| 6,163,563 A | 12/2000 | Baker et al. ................ | 385/130 |
| 6,363,102 B1 * | 3/2002 | Ling et al. .................. | 375/147 |
| 6,678,314 B1 * | 1/2004 | Juntti et al. ................. | 375/150 |
| 6,680,969 B1 * | 1/2004 | Molnar et al. .............. | 375/224 |
| 6,700,919 B1 * | 3/2004 | Papasakellariou ........... | 375/130 |

FOREIGN PATENT DOCUMENTS

| | | |
|---|---|---|
| EP | 0 898 379 | 2/1999 |
| WO | 96/10879 | 4/1996 |
| WO | 00/65797 | 11/2000 |

OTHER PUBLICATIONS

Glisic, Savo G. et al., "Design Study For A CDMA-Based LEO Satellite Network: Downlink System Level Parameters," IEEE Journal on Selected Areas in Communications, vol. 14, No. 9, Dec. 9, 1996.

* cited by examiner

*Primary Examiner*—Stephen Chin
*Assistant Examiner*—Ted M. Wang (57) ABSTRACT

A method and communications receiver is disclosed that removes Doppler frequency shift in a spread spectrum communications signal. A pilot channel rake section has I and Q Doppler estimation channels for estimating the Doppler change in frequency based on a common pilot channel. A data channel rake section has I and Q data channels for receiving the Doppler change in frequency from the pilot channel rake section and canceling any Doppler error.

24 Claims, 6 Drawing Sheets

FIG. 1A

RAKE RECEIVER

DOPPLER CORRECTED COMMUNICATIONS RECEIVER AND METHOD OF REMOVING DOPPLER FREQUENCY SHIFT

FIELD OF THE INVENTION

This invention relates to communications receivers, and more particularly, this invention relates to removing Doppler frequency shift in CDMA communications receivers.

BACKGROUND OF THE INVENTION

Cellular telephone and mobile telephone systems are becoming more commonplace. In third generation mobile systems that are currently being developed, the mobile system must support a mobile speed up to 500 Km/Hr, which incurs a large Doppler frequency shift. Many of these mobile systems use rake receivers for enhanced multipath discrimination and other advantages. These receivers are used with spread spectrum communication signals, such as a code division multiple access (CDMA) communication system, where the rake receiver performs continuous, detailed measurements of multipath characteristics to combat selective fading. This can be accomplished in some rake devices by detecting a signal from each path individually, using correlation methods and algebraically combining echo signals into a single detected signal. Most rake receivers use rake "fingers" or sections, which combine signals received from the various paths. The rake fingers can be analogized to matched filters, where path gains of each "finger" work similar to matched filter taps. Examples of various rake receivers and rake "finger" structures are disclosed in U.S. Pat. Nos. 5,659,573; 5,910,950; 6,085,104; and 6,163,563.

As noted before, the mobile systems support high speeds are subject to Doppler frequency shift. One conventional method for solving and eliminating Doppler frequency shift within spread spectrum receivers and typically rake receivers, is the use of channel estimation to estimate Doppler frequency shift. This type of system, however, requires a complex filter structure and an optimum filter, such as Wiener filter, that is not realizable in many circuits.

SUMMARY OF THE INVENTION

It is therefore an object of the present invention to provide a method and a receiver structure of removing the Doppler frequency shift in an optimum and realizable manner.

In accordance with the present invention, a novel architecture of a rake receiver uses differential detection to remove the Doppler frequency shift. A spread spectrum communications signal has a dedicated physical channel that carries the data and common pilot channel that carries the pilot and is received within a rake receiver. The Doppler change in frequency is estimated using the common pilot channel. The Doppler error is cancelled within the dedicated physical channel using the estimated Doppler frequency change.

The receiver is, in one aspect of the present invention, a rake receiver and the spread spectrum communications signal comprises a code division multiple access (CDMA) communications signal. The Doppler change in frequency is estimated, in one aspect of the present invention, by multiplying a channelization code into respective in-phase (I) and quadrature (Q) channels, summing over a symbol period, and sampling to obtain respective I and Q sampled values. To estimate the Doppler frequency shift, the sampled values are phase shifted, and an arc tangent taken of I and Q sampled values.

In yet another aspect of the present invention, the method comprises the step of estimating sine and cosine values of the estimated Doppler frequency shift to be multiplied within the dedicated physical channel. This channel can be split into I and Q data channels that receive an estimated Doppler change in frequency within respective I and Q Doppler estimation channels.

A communications receiver of the present invention includes a pilot channel rake section having I and Q Doppler estimation channels for estimating the Doppler change in frequency based on a common pilot channel. A data channel rake section has I and Q data branches that remove the Doppler frequency shift and have data recovered. Each I and Q data channel includes a delay circuit for receiving respective I and Q signals split from the spread spectrum communications signal at baseband and sine and cosine branches for receiving and multiplying into the sine and cosine branches the estimated Doppler change in frequency.

An addition circuit adds together any multiplied product received from respective sine and cosine branches. An integrator introduces a spreading factor when canceling Doppler error. Each I and Q Doppler estimation channel includes a mixer for receiving the spread spectrum communications signal at baseband and a channelization code. Each I and Q Doppler estimation channel also includes an integrator and sample and delay circuit, including a phase shifter. Each sample and delay circuit includes a multiplier for receiving a delay signal from the respective other I or Q Doppler estimation channel.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The present invention advantageously removes the Doppler frequency shift in a communications receiver, such as the illustrated rake receiver 10, using differential detection. As is well known, third generation mobile systems must support mobile speeds up to 500 Km/Hr, which incurs a large Doppler frequency shift. The architecture and circuit of the present invention uses differential detection and removes the Doppler frequency shift in the rake receiver 10.

As is well known, different spread spectrum communications signals can be used with rake receiver structures. In the present illustrated aspect of the invention, the type of spread spectrum communications signal is a direct sequence spread spectrum signal, such as a code division multiple access (CDMA) communications signal. As is well known, in the 3G wideband CDMA (W-CDMA) system, it includes a common pilot channel and dedicated physical channel, such as for data, e.g., a data channel. The present invention uses mathematical derivations and associated algorithms with the common pilot channel to estimate the Doppler frequency and use that Doppler frequency estimation to remove, i.e., cancel, the Doppler frequency for the dedicated physical channel of the wideband code division multiple access (W-CDMA) communications signal.

Figure 1A:
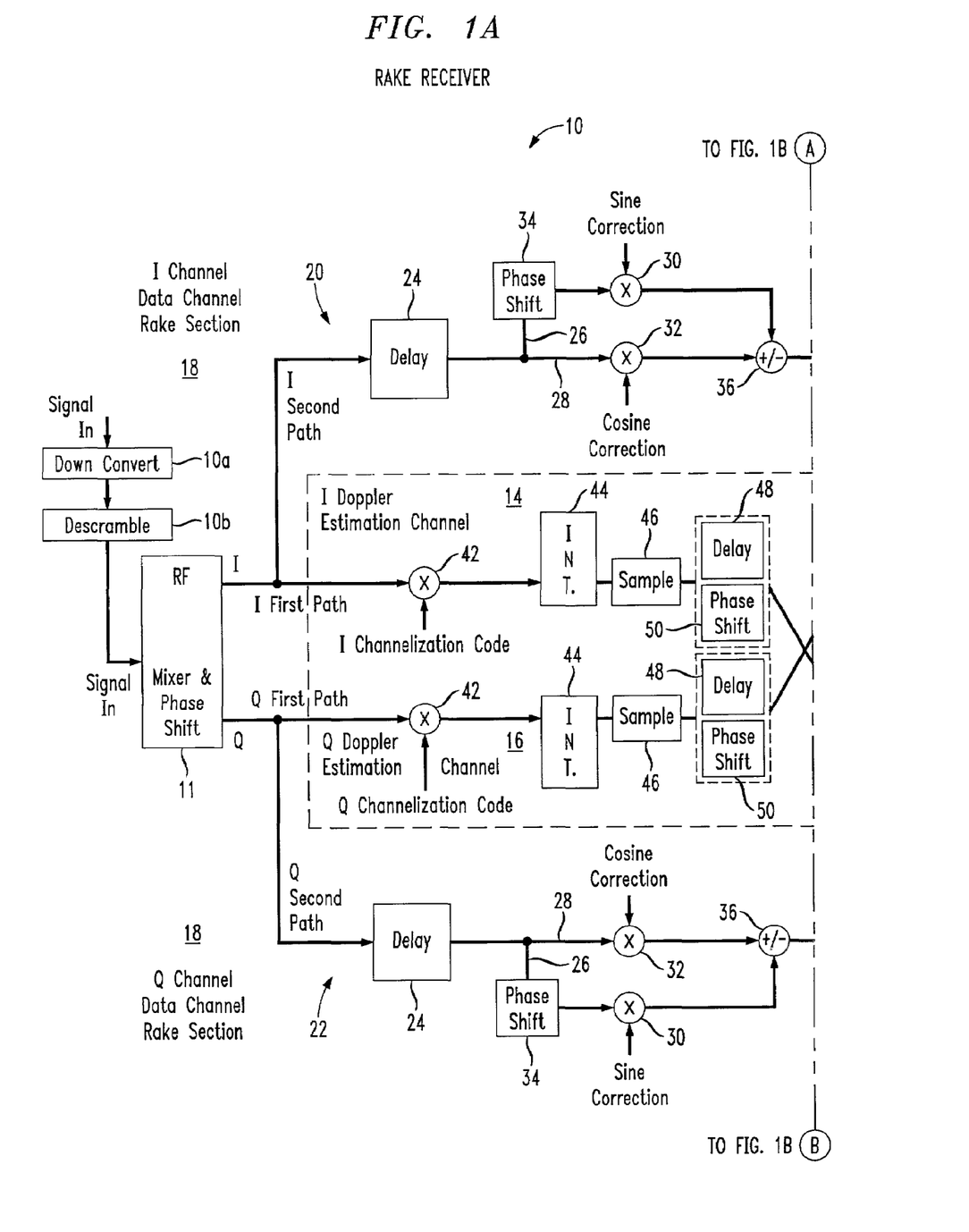
FIGS. 1A and 1B are high level block diagrama of a Doppler-corrected rake finger structure used in a communications receiver of the present invention.
Figure 1B:
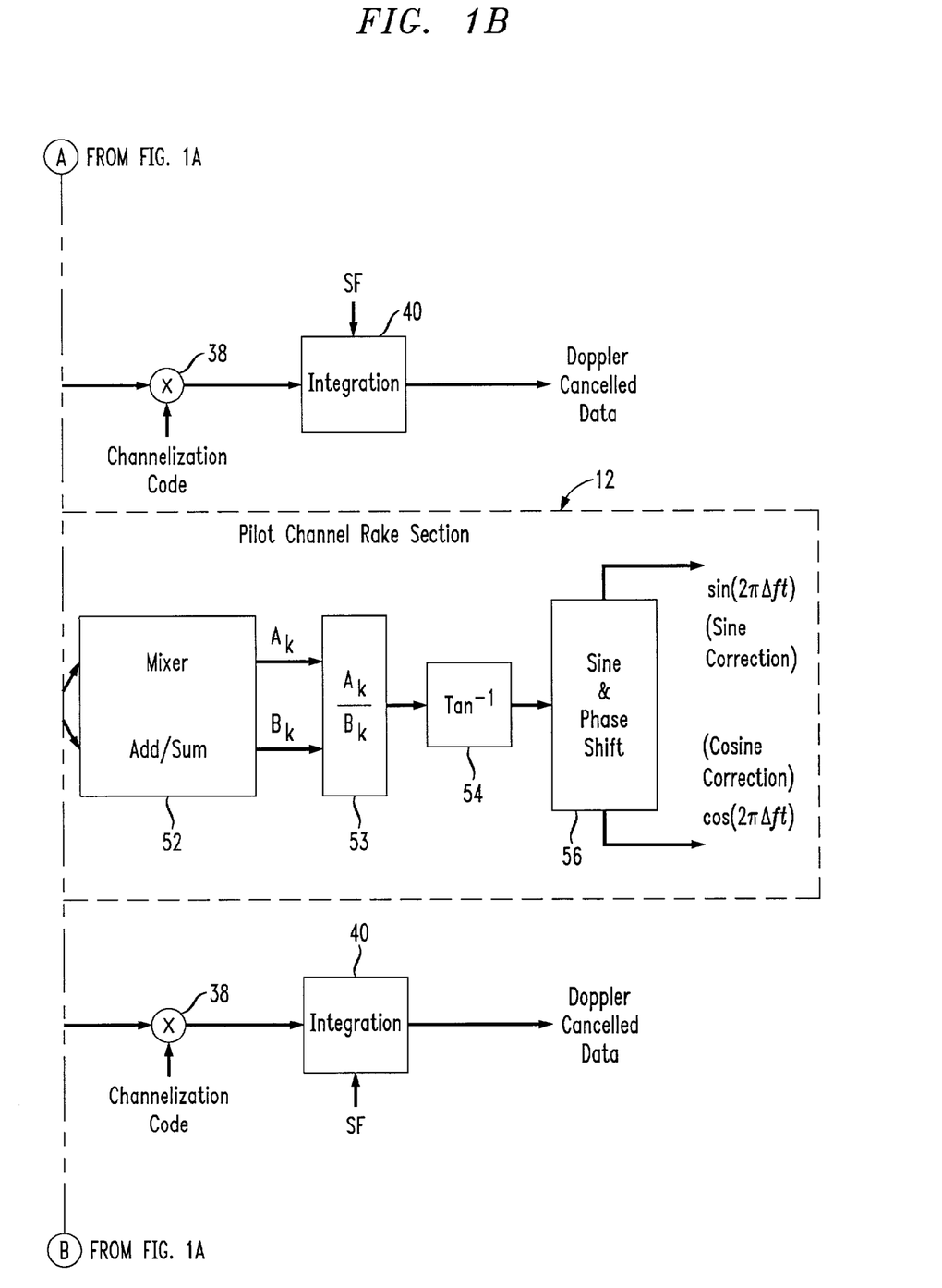

As shown in FIGS. 1A and 1B, a high level block diagram of a rake receiver 10 having a Doppler-corrected rake finger structure is illustrated. The signal is down converted 10a and descrambled 10b. The signal is next split at baseband via a mixer and phase shift circuit 11 into in-phase (I) and quadrature (Q) components and into in-phase (I) first and second pats and quadrature (Q) first and second paths. The first path includes a pilot channel rake section 12 having I and Q Doppler estimation channels 14, 16 for estimating the Doppler change in frequency based on a common pilot channel.

A data channel rake section 18 has two parts 20,22, which receive the data from the dedicated physical channel and cancels the Doppler frequency shift. To have data recovered, the rake section 12 receives the pilot from the common pilot channel and uses it to estimate the Doppler frequency shift. Each I and Q data channel 20,22 includes a delay circuit 24 for receiving respective I and Q signals split from the spread spectrum communications signal at baseband. Sine and cosine branches 26,28 have mixers 30,32 that receive and multiply at the mixers 30,32 the Doppler frequency change in frequency that is estimated from the pilot channel rake section 12. The sine branch 26 includes phase shift circuit 34 for shifting the delayed signal 90°, imparting the necessary phase change for the sine branch. An addition/subtraction circuit 36 adds and subtracts the necessary multiplied product received from respective sine and cosine branches 26,28. A mixer 38 receives the channelization code and an integration circuit 40 to cancel the Doppler error over every symbol. It integrates over one symbol time, which is equal to the spreading factor multiplied by the chip time ($SF \times T_c$).

Each I and Q Doppler estimation channel 14,16 includes a mixer 42 for receiving the I and Q portions of the spread spectrum communications signal at baseband and a respective I, Q channelization code. Each I and Q Doppler estimation channel also includes an integrator 44, a sample circuit 46, and a delay circuit 48, including a phase shifter 50 and multiplier and add/sum circuit 52. A divide circuit 53 for the produced Ak and Bk signal components is subject to an arc tangent function in arc tangent circuit 54, together with a sine and phase circuit 56 to produce the estimated sine and cosine Doppler frequency correction components. Further details of the circuit are shown and explained with reference to FIG. 3 below.

Figure 2:
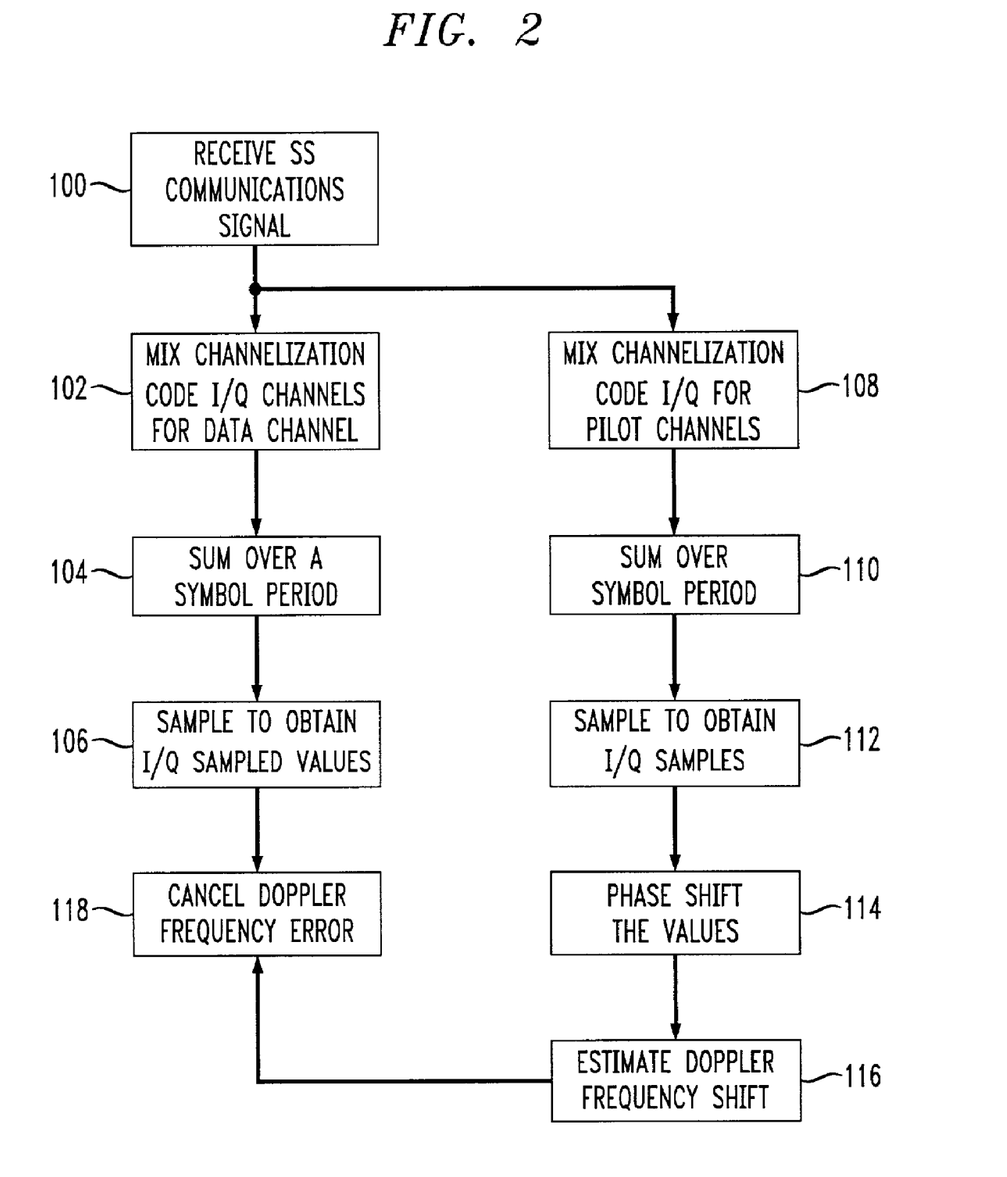
FIG. 2 is a high level flow chart illustrating basic operation of the method used with communications receiver of the present invention.

FIG. 2 illustrates a high level flow chart of the sequence of steps of the present invention, where a spread spectrum communication signal is received in a receiver (block 100). The spread spectrum communication signal has a dedicated physical channel and common pilot channel. A channelization code is multiplied (mixed) into respective in-phase (I) and quadrature (Q) channels (block 102), summed over a symbol period (block 104) and sampled to obtain respective I and Q sampled values (block 106). At the same time, on a parallel path, the channelization code I/Q is mixed for the pilot channels (block 108). These values are summed over the symbol period (block 110) and then sampled to obtain I/Q samples (block 112). These values are phase shifted (block 114) and the Doppler frequency shift is estimated (block 116). This value is used to cancel the Doppler frequency error (block 118) together with the samples to obtain the I/Q sampled values (block 106).

Figure 3A:
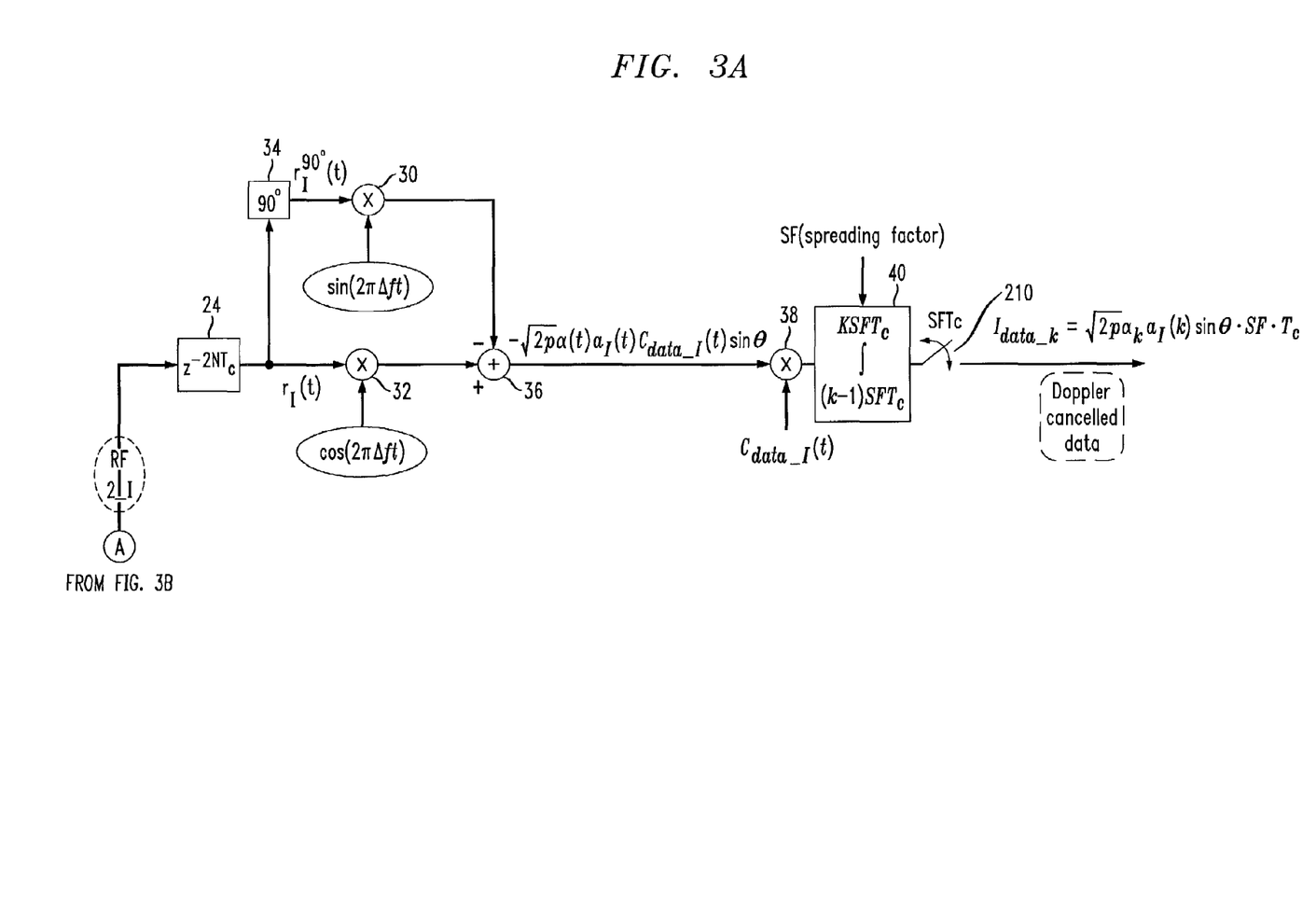
FIGS. 3A, 3B, and 3C are detailed block diagrams of the Doppler-corrected rake finger structure shown in FIGS. 1A and 1B.
Figure 3B:
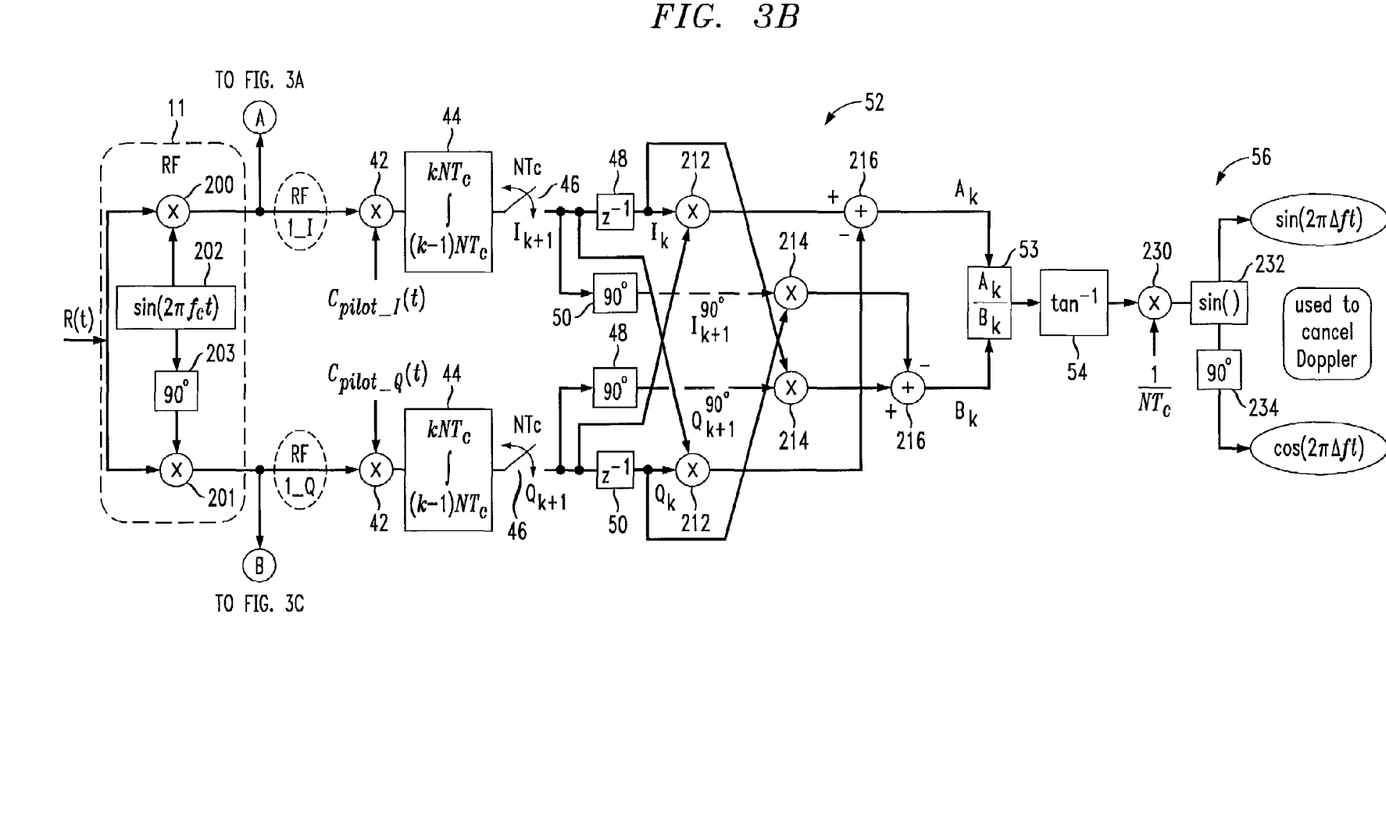
Figure 3C:
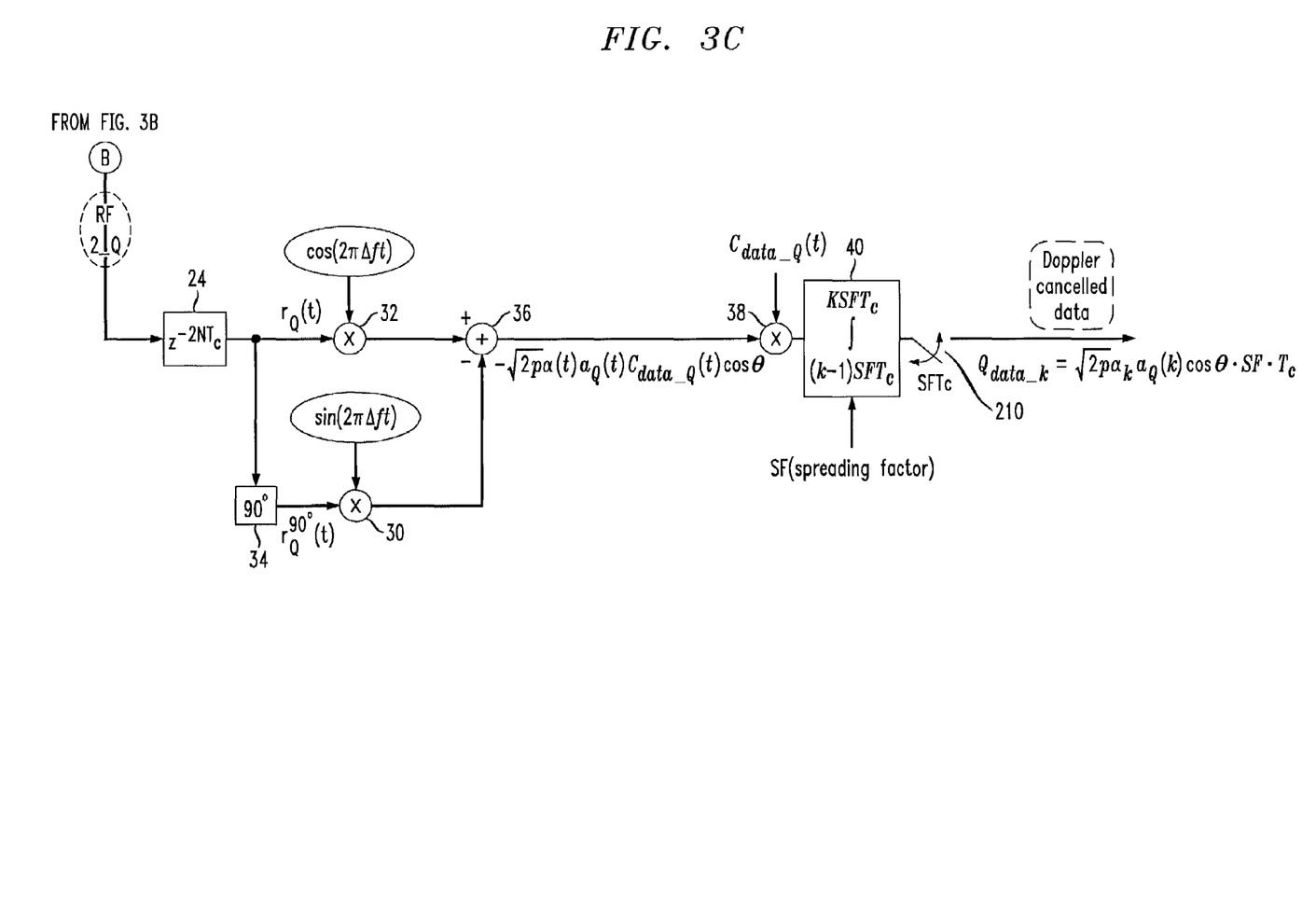

For purposes of explanation, a description of the algorithm used with differential detection in the rake receiver design shown in FIGS. 1 and 3 is set forth in detail, followed by a detailed description of the circuit shown in FIGS. 3A through 3C that implements the method and algoiithm.

As noted before, in the DL of a W-CDMA communication signal, a common pilot channel (CPICH) exists and is advantageously used in the present invention. A mathematical derivation of the present invention is possible by using the common pilot channel to estimate the Doppler frequency and use that estimation to remove the Doppler frequency for the dedicated physical channel (DPCH). As is known, the communication signal is received, downconverted and descrambled. In this description, R(t) is the signal after the down conversion and descrambling for each path.

$$r(t) = \sqrt{2p}\alpha(t)a_I(t)C_I(t)\sin(2\pi\Delta ft + \theta(t)) + n_I(t) + \sqrt{2p}\alpha(t)a_q(t)C_Q(t)\cos(2\pi\Delta ft + \theta(t)) + n_Q(t)$$    Equation 1

In this equation, p is the signal power. $C_I(t)$ and $C_Q(t)$ are the channelization codes for the I and Q channels respectively, while $\alpha(t)$ is the fading amplitude. $\theta(t)$ is the phase error and $\Delta f = f_d + f_e$ is the sum of Doppler shift frequency and frequency error due to an imperfect down conversion.

The system uses the common pilot to estimate the frequency error, $a_I(t)$ and $a_Q(t)$ are symbol data. It should be understood, however, that the system can be extended to using the pilot pattern in the dedicated common control physical channel also.

The channelization code in the I and Q channels respectively are attached (in DL W-CDMA, they are the same), and they are summed over the $NT_c$, where N is the symbol period. (N=256 in the common pilot channel in this non-limiting example). The signal is sampled. The sampled values $I_k$ and $Q_k$ are given as follows. For the explanatory purposes in the following equation, the noise terms are ignored.

$$I_k = \int_{(k-1)NT_c}^{kT_c} \sqrt{2p}\,\alpha(t)a_1(t)\sin(2\pi\Delta ft + \theta(t)) = $$    Equation 2

$$\sqrt{2p}\,a_k a_{Ik}[\cos(2\pi\Delta f(k-1)NT_c + \theta) - \cos(2\pi\Delta fkNT_c + \theta)]$$

-continued $$Q_k = \int_{(k-1)NTc}^{kTc} \sqrt{2p}\, \alpha(t)a_Q(t)\cos(2\pi\Delta ft + \theta(t)) =$$

$$\sqrt{2p}\, \alpha_k a_{Qk}[\sin(2\pi\Delta f kNT_c + \theta) - \sin(2\pi\Delta f(k-1)NT_c + \theta)]$$

In Equation 2, it is assumed that $\alpha(t) \approx \alpha$ and $\theta(t) \approx \theta$ since $N \cdot Tc \ll 1/fd$ (flat fading). Moreover, by taking a 90 degree phase shift of $I_k$ and $Q_k$, the following is obtained:

$I_k^{90°} = \sqrt{2}p\alpha_k a_{1k}[\sin(2\pi\Delta f kNT_c+\theta)-\sin(2\pi\Delta f(k-1)NT_c+\theta]$ $Q_k^{90°} = \sqrt{2}p\alpha_k a_{Qk}[\cos(2\pi\Delta f kNT_c+\theta)-\cos(2\pi\Delta f(k-1)NT_c+\theta]$  Equation 3

These quantities are used to estimate the $\Delta f$:

$A_k = I_k Q_{k+1} - Q_k I_{k+1} = \sin(2\pi\Delta f(2NT_c)) - 2\sin(2\pi\Delta fNT_c)$
$= 2 \sin(2\pi\Delta fNT_c)[\cos 2\pi\Delta fNT_c - ]$ $B_k = I_k Q^{90°}_{k-1} - Q_k I^{90°}_{k+1} = 2 \cos^2(2\pi\Delta fNT_c) - 2\cos(2\pi\Delta fNT_c) = 2\cos(2\pi\Delta fNT_c)[\cos 2\pi\Delta fNT_c - 1]$  Equation 4

From Equation 4, the arctan is used to obtain an estimate of $\Delta f$:

$$2\pi\Delta\hat{f} = \frac{1}{NT_c}\tan^{-1}\left(\frac{A_k}{B_k}\right)$$

The $\Delta f$ estimate is used to remove the frequency error due to the Doppler shift and imperfect down conversion.

Let $r_1(t)$ and $r_g(t)$ represent the in-phase and quadrature part of the received signal for another rake finger that is used to receive the data channel, such as shown in FIGS. 1A, 1B, 3A, 3B, and 3C Therefore:

$r_1(t) = \sqrt{2}p\alpha(t)a_1(t)C_1(t)\sin(2\pi\Delta ft+\theta(t))+n_1(t)$ $r_Q(t) = \sqrt{2}p\alpha(t)a_Q(t)C_{Q1}(t)\cos(2\pi\Delta ft+\theta(t))+n_Q(t)$  Equation 6

$X_1(t) = r_1(t)\cdot\cos 2\pi\Delta ft - r_1^{90°}(t)\cdot\sin 2\pi\Delta f = \sqrt{2}p\alpha(t)a_1(t)C_1(t)\sin(\theta(t))+n_{X1}(t)$ $X_Q(t) = r_Q(t)\cdot\cos 2\pi\Delta ft - r_Q^{90°}(t)\cdot\sin 2\pi\Delta f = \sqrt{2}p\alpha(t)a_Q(t)C_Q(t)\cos(\theta(t)+n_{Xq}(t)$  Equation 7

From Equation 7, the frequency-corrected data is obtained. The phase error $\theta(t) \approx \theta$ is over the symbol period. Therefore, it can be alleviated using the simple channel estimation.

In the DL of W-CDMA, because the spreading factor (SF) is not changing dynamically, the channelization code is multiplied for the channel and accumulated over $SF \cdot T_c$, i.e., the symbol period.

FIGS. 3A through 3C show a more detailed block circuit diagram of the rake finger structure shown in FIG. 1. There is no illustrated acquisition and tracking circuit as would typically be used in a rake receiver. The phase error introduced due to the imperfect acquisition and tracking is considered in $\theta(t)$, which can be alleviated via simple averaged channel estimation, There is a $2NT_c$ delay in the other fingers, because it takes $2NT_c$ samples to obtain $I_k$, $I_{k+1}$, $Q_k$, and $Q_{k+1}$.

As illustrated, the spread spectrum communications signal after down conversion is received within the RF receive circuitry 11 where it is split into two signals and mixed in mixers 200, 201 with signals produced from the appropriate sine ($2\pi f_c T$) and 90° phase shift circuits 202, 203 to form the respective I and Q baseband signals. These signals, in turn, are again split as described before.

As illustrated, on the second path for the in-phase (I) and quadrature (Q) portions, the signal is delayed by the delay circuit 24 and then split into sine, cosine branches, where on sine branch it is rotated 90°. After mixing, the two signals enter the addition/subtraction circuit 36 and are combined and mixed with the channelization code in mixer 38 for the data channel and integrated over SF·Tc period of time. The signal is sampled at circuit 210 to form the Doppler cancelled data.

As to the first path of the I and Q signal, the signals enter the mixers 42 where the respective I or Q channel components are mixed with the pilot channelization code and then integrated, sampled, delayed and 90° phase shifted. Part of the sampled signal is cross-coupled into a pair of mixer/multipliers 212 that receive signals from the delay circuit. The signals from the delay circuit also are cross-coupled into a second pair of mixer/multipliers 214 that receive the 90° phase shift signal. These are then received within respective addition/subtraction circuits 216 producing signals Ak, Bk, which are received and divided by the dividing circuit 53. The arc tangent is taken in circuit 54. The mixer/multiplier 230 receives the signal and mixes input $1/NT_c$, which product is received within a sine logic circuit 232 where the estimated sine Doppler cancellation signal and the cosine cancellation signal (after entering the 90° phase shift circuit 234) is obtained. These resultant values are used to cancel the Doppler as described above.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

That which is claimed is:

1. A method of removing a Doppler change in frequency in a spread spectrum communications signal comprising the steps of:
   receiving a spread spectrum communications signal within a communications receiver having a dedicated physical channel and common pilot channel;
   estimating the Doppler change in frequency using the common pilot channel; and
   removing the Doppler change in frequency within the dedicated physical channel using the estimated Doppler change in frequency; introducing a spreading factor using an integrator when canceling any Doppler change in frequency.

2. A method according to claim 1, comprising receiving the spread spectrum communications signal within a rake receiver.

3. A method according to claim 1, wherein said spread spectrum communication signal comprises a code division multiple access (CDMA) communications signal.

4. A method according to claim 1, wherein the step of estimating comprises the step of multiplying a channelization code into respective In-phase (I) and Quadrature (Q) channels, summing over a symbol period, and sampling to obtain respective I and Q sampled values.

5. A method according to claim 4, comprising phase shifting and taking an arctangent of I and Q sampled values to estimate the Doppler change in frequency.

6. A method according to claim 5, comprising estimating sine and cosine values or the estimated Doppler change in frequency to be multiplied within the dedicated physical channel.

7. A method according to claim 1, comprising splitting the dedicated physical channel into I and Q data channels that receive an estimated Doppler change in frequency.

8. A method according to claim 7, comprising estimating the Doppler change in frequency within respective I and Q Doppler estimation channels.

9. The method of claim 1, comprising using differential detection for estimating the Doppler change in frequency.

10. A method of removing a Doppler change in frequency in a spread spectrum communications signal comprising the steps of:
  receiving a spread spectrum communications signal within a rake receiver having a dedicated physical channel and common pilot channel;
  estimating the Doppler change in frequency within a pilot channel rake section using the common pilot channel; and
  removing the Doppler change in frequency of the spread spectrum communications signal within a data channel rake section by multiplying the Doppler change in frequency estimated from the pilot channel rake section into the dedicated physical channel, introducing a spreading factor using an integrator when canceling any Doppler change in frequency.

11. A method according to claim 10, wherein the step of estimating comprises multiplying a channelization code into respective In-phase (I) and Quadrature (Q) channels, summing over a symbol period, and sampling to obtain respective I and Q sampled values.

12. A method according to claim 11, comprising phase shifting and taking an arctangent or I and Q sampled values to estimate the Doppler change in frequency.

13. A method according to claim 12, comprising estimating sine and cosine values of the estimated Doppler change in frequency to be multiplied within the dedicated physical channel.

14. A method according to claim 10, comprising splitting the dedicated physical channel into I and Q data channels that receive an estimated Doppler change in frequency.

15. A method according to claim 14, comprising estimating the Doppler change in frequency within respective I and Q Doppler estimation channels.

16. The method of claim 10, comprising using differential detection for estimating the Doppler change in frequency.

17. A communications receiver that removes a Doppler change in frequency in a spread spectrum communications signal comprising:
  a pilot channel rake section having I and Q Doppler estimation channels for estimating the Doppler change in frequency in the communications signal based on a common pilot channel; and
  a data channel rake section having I and Q data channels for receiving the data in the communications signal, which has a frequency error caused by the Doppler change in frequency wherein each I and Q data channel comprises a delay circuit for receiving respective I and Q signals split from the spread spectrum communications signal at baseband and sine and cosine branches for receiving and multiplying into the sine and cosine branches the estimated Doppler change in frequency.

18. A communications receiver according to claim 17, comprising an addition circuit for adding together any multiplied product received from respective sine and 1cosine branches.

19. A communications receiver according to claim 17, wherein each I and Q Doppler estimation channel comprises a mixer for receiving the spread spectrum communications signal at baseband and a channelization code.

20. A communications receiver according to claim 17, wherein each I and Q Doppler estimation channel comprises an integrator and sample and delay circuit.

21. A communications receiver according to claim 20, wherein each I and Q Doppler estimation channel comprises a phase shifter.

22. A communications receiver according to claim 20, wherein each I and Q Doppler estimation channel comprises a multiplier for receiving a delay signal from the respective other I or Q Doppler estimation channel.

23. The communications receiver of claim 17, wherein the pilot channel rake section uses differential detection for estimating the Doppler change in frequency.

24. A communications receiver that removes a Doppler change in frequency in a spread spectrum communications signal comprising:
  a pilot channel rake section having I and Q Doppler estimation channels for estimating the Doppler change in frequency in the communications signal based on a common pilot channel; and
  a data channel rake section having I and Q data channels for receiving the data in the communications signal, which has a frequency error caused by the Doppler change in frequency comprising an integrator for introducing a spreading factor when canceling any Doppler error.

* * * * *